United States Patent
Fowler et al.

(10) Patent No.: US 11,769,140 B2
(45) Date of Patent: Sep. 26, 2023

(54) SYSTEM AND METHOD FOR LOCATION-BASED INDIVIDUALIZED CONTENT AND MOBILE WALLET OFFERS

(71) Applicant: Digital Seat Media, Inc., Fort Worth, TX (US)

(72) Inventors: Cameron Fowler, Fort Worth, TX (US); Matthew Sullivan, Austin, TX (US)

(73) Assignee: Digital Seat Media, Inc., Fort Worth, TX (US)

( * ) Notice: Subject to any disclaimer, the term of this patent is extended or adjusted under 35 U.S.C. 154(b) by 134 days.

(21) Appl. No.: 17/454,313

(22) Filed: Nov. 10, 2021

(65) Prior Publication Data

US 2022/0067697 A1 Mar. 3, 2022

Related U.S. Application Data

(60) Division of application No. 17/249,613, filed on Mar. 6, 2021, now Pat. No. 11,182,768, which is a
(Continued)

(51) Int. Cl.
*G06Q 20/32* (2012.01)
*G06Q 20/38* (2012.01)
(Continued)

(52) U.S. Cl.
CPC ..... *G06Q 20/3276* (2013.01); *G06Q 20/3263* (2020.05); *G06K 7/10297* (2013.01); *G06K 7/1413* (2013.01); *G06K 7/1417* (2013.01)

(58) Field of Classification Search
None
See application file for complete search history.

(56) References Cited

U.S. PATENT DOCUMENTS 6,144,304 A 11/2000 Webb
6,658,348 B2 12/2003 Rudd et al.
(Continued)

FOREIGN PATENT DOCUMENTS

EP 2254083 A1 11/2010
EP 2988260 A1 2/2016
(Continued)

OTHER PUBLICATIONS

"QR Codes: Here They Come, Ready or Not", Printing Tips: Precision Printing Newsletter, vol. 1, No. 1, May 2011.
(Continued)

*Primary Examiner* — Joseph W. King
(74) *Attorney, Agent, or Firm* — Vos-IP, LLC

(57) ABSTRACT

A system for displaying customized mobile content to users at a venue via a user device, includes a server system in conjunction with a plurality of machine-readable codes mounted within the venue. The server system performs the following steps: providing mobile content in a database; collecting user data associated with the user; receiving a request from one of the user devices, the request being generated by scanning one of the machine-readable codes with the user device; determining the user data associated with the user who scanned the machine-readable code; selecting, based upon the user data, customized mobile content from the mobile content in the database; and providing the customized mobile content to the user device.

20 Claims, 7 Drawing Sheets

Related U.S. Application Data continuation-in-part of application No. 16/812,203, filed on Mar. 6, 2020.

(60) Provisional application No. 62/814,292, filed on Mar. 6, 2019.

(51) Int. Cl.
*G06K 7/10* (2006.01)
*G06K 7/14* (2006.01)

(56) References Cited

U.S. PATENT DOCUMENTS

| | | |
|---|---|---|
| 7,379,886 B1 | 5/2008 | Zaring et al. |
| 7,587,214 B2 | 9/2009 | Inselberg |
| 7,817,990 B2 | 10/2010 | Pamminger et al. |
| 8,056,802 B2 | 11/2011 | Gressel et al. |
| 8,494,838 B2 | 7/2013 | Donabedian et al. |
| 8,731,583 B2 | 5/2014 | Wengrovitz |
| 8,971,861 B2 | 3/2015 | Gupta et al. |
| 9,002,727 B2 | 4/2015 | Horowitz et al. |
| 9,117,231 B2 | 8/2015 | Rodgers et al. |
| 9,201,470 B2 | 12/2015 | Kim et al. |
| 9,223,750 B2 | 12/2015 | Liu et al. |
| 9,223,885 B2 | 12/2015 | Marsico |
| 9,324,079 B2 | 4/2016 | Moulin et al. |
| 9,405,844 B2 | 8/2016 | Lim et al. |
| 9,451,389 B2 | 9/2016 | Beg et al. |
| 9,681,302 B2 | 6/2017 | Robinton et al. |
| 9,767,645 B1 | 9/2017 | Cronin et al. |
| 9,826,049 B2 | 11/2017 | Lim et al. |
| 9,870,585 B2 | 1/2018 | Cronin et al. |
| 9,883,344 B2 | 1/2018 | Bolton et al. |
| 9,965,819 B1 | 5/2018 | Devries |
| 9,977,865 B1 | 5/2018 | Laborde |
| 10,009,429 B2 | 6/2018 | Manchado |
| 10,127,746 B2 | 11/2018 | Bergdale et al. |
| 10,163,124 B2 | 12/2018 | Horowitz et al. |
| 10,178,166 B2 | 1/2019 | Sharan |
| 10,248,905 B1 | 4/2019 | Beatty |
| 10,942,913 B1* | 3/2021 | Khoyilar ............. G06F 9/542 |
| 11,074,543 B1 | 7/2021 | Rudeegraap et al. |
| 2001/0050310 A1 | 12/2001 | Rathus et al. |
| 2002/0016816 A1 | 2/2002 | Rhoads |
| 2003/0008661 A1 | 1/2003 | Joyce et al. |
| 2003/0041155 A1 | 2/2003 | Nelson et al. |
| 2006/0077253 A1 | 4/2006 | Vanriper et al. |
| 2006/0094409 A1 | 5/2006 | Inselberg |
| 2007/0229217 A1 | 10/2007 | Chen et al. |
| 2009/0085724 A1 | 4/2009 | Naressi et al. |
| 2009/0138920 A1 | 5/2009 | Anandpura et al. |
| 2009/0189982 A1 | 7/2009 | Tawiah |
| 2010/0077429 A1 | 3/2010 | Kim et al. |
| 2010/0184462 A1 | 7/2010 | Lapstun et al. |
| 2010/0228577 A1 | 9/2010 | Cunningham et al. |
| 2010/0245083 A1 | 9/2010 | Lewis |
| 2010/0279710 A1 | 11/2010 | Dicke et al. |
| 2011/0034252 A1 | 2/2011 | Morrison et al. |
| 2012/0011015 A1 | 1/2012 | Singh et al. |
| 2012/0130770 A1 | 5/2012 | Heffernan |
| 2012/0233237 A1 | 9/2012 | Roa et al. |
| 2012/0280784 A1 | 11/2012 | Gaviria Velez et al. |
| 2013/0073366 A1 | 3/2013 | Heath |
| 2013/0080218 A1 | 3/2013 | Wildern, IV et al. |
| 2013/0085834 A1 | 4/2013 | Witherspoon, Jr. et al. |
| 2013/0166384 A1 | 6/2013 | Das |
| 2013/0218721 A1 | 8/2013 | Borhan et al. |
| 2013/0275221 A1 | 10/2013 | Zeto, III et al. |
| 2013/0297430 A1 | 11/2013 | Soergel |
| 2013/0311214 A1 | 11/2013 | Marti et al. |
| 2014/0039945 A1 | 2/2014 | Coady et al. |
| 2014/0046802 A1 | 2/2014 | Hosein et al. |
| 2014/0058886 A1 | 2/2014 | Gopalakrishnan et al. |
| 2014/0156752 A1 | 6/2014 | Fetyko |
| 2014/0278592 A1 | 9/2014 | Giampapa |
| 2014/0279072 A1 | 9/2014 | Serino |
| 2014/0282684 A1 | 9/2014 | Keen et al. |
| 2014/0365574 A1 | 12/2014 | Franks et al. |
| 2015/0012307 A1 | 1/2015 | Moss |
| 2015/0067811 A1 | 3/2015 | Agnew et al. |
| 2015/0073879 A1 | 3/2015 | Acosta-Cazaubon |
| 2015/0081532 A1 | 3/2015 | Lewis et al. |
| 2015/0088658 A1 | 3/2015 | Iiduka et al. |
| 2015/0112704 A1 | 4/2015 | Braun |
| 2015/0120388 A1 | 4/2015 | Tan et al. |
| 2015/0161684 A1 | 6/2015 | Raikula |
| 2015/0279164 A1 | 10/2015 | Miller et al. |
| 2015/0294392 A1 | 10/2015 | Sharon et al. |
| 2015/0296347 A1 | 10/2015 | Roth et al. |
| 2015/0304601 A1 | 10/2015 | Hicks et al. |
| 2015/0348329 A1* | 12/2015 | Carre ............. H04N 5/44 345/633 |
| 2015/0379791 A1 | 12/2015 | Russell et al. |
| 2016/0086228 A1 | 3/2016 | Babb et al. |
| 2016/0104041 A1 | 4/2016 | Bowers et al. |
| 2016/0104347 A1 | 4/2016 | Yang |
| 2016/0189287 A1 | 6/2016 | Van Meter |
| 2016/0191821 A1 | 6/2016 | Dwarakanath et al. |
| 2016/0217258 A1 | 7/2016 | Pitroda et al. |
| 2016/0282619 A1 | 9/2016 | Oto et al. |
| 2016/0307379 A1 | 10/2016 | Moore, Jr. et al. |
| 2016/0335565 A1 | 11/2016 | Charriere et al. |
| 2016/0381023 A1 | 12/2016 | Dulce et al. |
| 2017/0039599 A1 | 2/2017 | Tunnell et al. |
| 2017/0142460 A1* | 5/2017 | Yang ............. H04N 21/4627 |
| 2017/0250006 A1 | 8/2017 | Ovalle |
| 2017/0308692 A1 | 10/2017 | Yano |
| 2017/0330263 A1 | 11/2017 | Shaffer |
| 2017/0337531 A1 | 11/2017 | Kohli |
| 2018/0025402 A1 | 1/2018 | Morris |
| 2018/0026954 A1 | 1/2018 | Toepke et al. |
| 2018/0089775 A1 | 3/2018 | Frey et al. |
| 2018/0276705 A1 | 9/2018 | Jay et al. |
| 2018/0288394 A1 | 10/2018 | Aizawa |
| 2018/0330327 A1 | 11/2018 | Hertenstein et al. |
| 2018/0336286 A1 | 11/2018 | Shah |
| 2018/0353999 A1 | 12/2018 | McGillicuddy et al. |
| 2018/0376217 A1 | 12/2018 | Kahng et al. |
| 2019/0098504 A1 | 3/2019 | Van Betsbrugge et al. |
| 2019/0130450 A1 | 5/2019 | Lamont |
| 2019/0220715 A1 | 7/2019 | Park et al. |
| 2019/0385128 A1 | 12/2019 | Cummings |
| 2020/0035019 A1 | 1/2020 | Cappello et al. |
| 2020/0104601 A1 | 4/2020 | Karoui et al. |
| 2020/0184547 A1 | 6/2020 | Andon et al. |
| 2020/0213006 A1 | 7/2020 | Graham et al. |
| 2020/0236278 A1 | 7/2020 | Yeung et al. |
| 2020/0320911 A1 | 10/2020 | Bruce |
| 2020/0327997 A1 | 10/2020 | Behrens et al. |
| 2020/0413152 A1 | 12/2020 | Todorovic et al. |
| 2021/0019564 A1 | 1/2021 | Zhou et al. |
| 2021/0019715 A1 | 1/2021 | Stier et al. |
| 2021/0027402 A1 | 1/2021 | Davis et al. |
| 2021/0065256 A1 | 3/2021 | Shontz |
| 2021/0118085 A1 | 4/2021 | Bushnell et al. |
| 2021/0247947 A1 | 8/2021 | Jaynes et al. |
| 2021/0248338 A1 | 8/2021 | Spivack et al. |
| 2021/0390509 A1 | 12/2021 | Fowler et al. |
| 2022/0114228 A1 | 4/2022 | Fowler et al. |
| 2022/0167021 A1 | 5/2022 | French et al. |
| 2022/0172128 A1 | 6/2022 | Lore |
| 2022/0188839 A1 | 6/2022 | Andon et al. |

FOREIGN PATENT DOCUMENTS

| | | |
|---|---|---|
| EP | 3550844 A1 | 10/2019 |
| FR | 3092195 A1 | 7/2020 |
| KR | 10-2015-0042885 A | 4/2015 |
| WO | WO/2006/011557 A1 | 2/2006 |
| WO | WO/2008/124168 A1 | 10/2008 |
| WO | WO/2013/120064 A1 | 8/2013 |
| WO | WO/2014/081584 A1 | 5/2014 |
| WO | WO/2014/112686 A1 | 7/2014 |

(56) References Cited

FOREIGN PATENT DOCUMENTS

| WO | WO/2015/035055 A1 | 3/2015 |
| --- | --- | --- |
| WO | WO/2016/041018 A1 | 3/2016 |
| WO | WO/2019/016602 A2 | 1/2019 |

OTHER PUBLICATIONS

McLaren, "Women's Beach Volleyballers Sign Deal to Display QR Code on Their Rears!", Digital Sport, Aug. 9, 2011, https://digitalsport.co/women%E2%80%99s-beach-volleyballers-sign-deal-to-display-qr-code-on-their-rears.

Unruh, "OU's Sooner Schooner Will Run on Field as Football Gameday Traditions Remain in New Ways: 'We Feel Like We Can Safely Do That'", The Oklahoman, Sep. 10, 2020, https://www.oklahoman.com/story/sports/columns/2020/09/10/sooner-schooner-will-run-field-football-gameday-traditions-remain-new-ways-feel-like-can-safely-that/60383091007/.

"Blockchain", Wikipedia, Sep. 27, 2019.

"URL Redirection", Wikipedia, Mar. 21, 2021.

"Web Template System", Wikipedia, Mar. 2, 2021.

Garg, "QR Codes in Sporting Goods Companies: Eight Use Cases Across the Industry", Scanova Blog, Dec. 11, 2019, https://scanova.io/blog/qr-codes-sporting-goods-companies/.

International Search Report issued in International Application No. PCT/US2021/070248 dated May 18, 2021.

\* cited by examiner

SYSTEM AND METHOD FOR LOCATION-BASED INDIVIDUALIZED CONTENT AND MOBILE WALLET OFFERS

CROSS-REFERENCE TO RELATED APPLICATIONS

This application is a divisional of U.S. patent application Ser. No. 17/249,613 filed on Mar. 6, 2021, which is a continuation-in-part of U.S. patent application Ser. No. 16/812,203, filed on Mar. 6, 2020, which claims the benefit of U.S. Provisional Patent Application No. 62/814,292, filed on Mar. 6, 2019, with the United States Patent and Trademark Office, the contents of which are incorporated herein by reference in their entirety.

FIELD OF THE INVENTION

This invention relates generally to systems and methods for providing location based individualized content delivery. The system is capable of providing individualized content to each machine-readable code, or a group of machine-readable codes, based on a number of data points in real time. The system also has the ability to alter provided content based on past data collected from user(s) input and other factors in real time. The system can be implemented in entertainment venues, as well as other areas where mobile engagement is desired and/or required, such as college dorm rooms, hotel rooms, cruise ships, trains, aircraft, rideshare vehicles and the like.

BACKGROUND OF THE INVENTION

Every machine-readable code (MRC) in a plurality of codes is typically programmed using an identical code (e.g., QR, Snap, etc.), NFC chip and/or machine-readable code identifier/URL destination/App destination, etc. Using the same identifier on all MRCs does not typically allow for individualized content offerings on a "per code" basis.

The prior art teaches various systems and methods for providing content to persons attending an event at a venue, such as a sports event, concert, and other similar location-based events. Some level of customization is taught in some of these embodiments. Examples of these teachings include the following:

Marsico, WO/2015/035055, teaches a system for performing multiple marketing operations at a sports venue, arena, etc. The system discusses a list of options, such as surveying a user, providing coupons, and other related provision of marketing materials. It also teaches enabling a user to order products (e.g., food) at the venue, for delivery to the scanned seat. The system uses a scannable information encoded graphic image, such as a barcode or a quick response (QR) code, near-field communication (NFC) code, radio-frequency identification (RFID) code. A mobile communication device such as a smartphone, tablet computer or other mobile computer may include a scan client module for scanning and communicating QR code information (either an app or without). QR code scanning is accomplished by a camera module that is associated with the smartphone or other mobile computing device. The scan-enabled client module communicates the scanned QR code information to an associated server application for collecting, processing, and reporting scan data. Marsico, U.S. Pat. No. 9,223,885, teaches a similar system for gathering survey information via a QR code system.

Lim, U.S. Pat. No. 9,826,049, teaches the basic system wherein QR codes or the like are used in hard link applications (linking a physical object or location with a Web link), by which different users may receive different information in response to a user's interaction with a touchpoint. The content delivered to a particular user in response to a hard link code or a presented hyperlink may be dependent on the time of the scan, the geographic location of the user, a weather condition at the geographical location, personal information associated with the user, a number of previous scans of the code by prior individuals, and any combination of the these or other variables, which may be determined by an originator of the QR code or other party. User devices may be redirected to alternate content or network addresses based on one or more programmed conditions.

Beg, U.S. Pat. No. 9,451,389, teaches a system for communicating informational content using a near-field communication (NFC). Uniquely programmed NFC stickers can be used conjunction with NFC enabled devices, such as a smart phone, to upload a personalized multimedia greeting on a central server. Once the stickers have been distributed, a recipient can tap on the same sticker and play the greeting message using the smart phone. Retail consumers can tap on NFC codes with a smart phone to view product informational content that has been hosted on the central server by retailers and manufactures.

Rodgers, U.S. Pat. No. 9,117,231, teaches an order taking system for ordering menu items for delivery to a station at a premise, such as a table at a restaurant. The system uses a downloaded application, which is used to scan a QR code or NFC code on a table. The location is identified using the restaurant and table identifier(s) extracted from the QR code. This location is used to identify the correct restaurant menu from the central platform database. The order may be placed, payment made, and delivery is made to the location corresponding to the QR code. Meter, US 2016-0189287 A1 teaches a similar food ordering system.

Horowitz, U.S. Pat. No. 9,002,727, teaches a system which uses a QR code (or NFC code) to direct a client device to send a first request to a first server identified by the URL. In response to the first request, the client device receives from the first server data configured to cause the client device to display, to a user of the client device, at least one of: a video or an interactive Web page. Responsive to the data encoded in the QR code, the client device sends to a coupon server identification data associated with a user of the client device, and a request for the coupon server to distribute a digital coupon for an offer associated with an identifier encoded within the QR code to an account associated with the user. The distribution of the coupon may be predicated upon the user of the client device to perform a "predetermined activity" (e.g., watching an advertisement video, etc.) to qualify for the coupon.

Lewis, US 2015-0081532 A1, teaches a system that uses a combination of QR Codes and venue specific localized WiFi to provide mobile venue related services in a covered venue area. The system includes food ordering and similar services, as well as a variety of other services.

SUMMARY OF THE INVENTION

The embodiments detailed herein specifically detail systems and methods for generating content by accessing a machine-readable code ("MRC"). In particular, preferred embodiments generate unique content, and wherein the system utilizes a unique ID or certificate to identify a user device within the system. These advantages allow for novel and unique opportunities that are not possible in the prior art. With regard to entertainment venues, the present invention provides a system for the display of interactive content on a user device based on a number of determining factors including seat location, venue location, past user interactions, as well as data provided from other sources such as ticketing software and advertising database portals.

The system includes a plurality of MRCs, each of the MRCs encoding a unique address and/or identification number that will direct the user device to a server system. The system may work independently of other multimedia displays located inside of the venue while providing content that is prescheduled or managed off site by the system. In certain embodiments, the system may also orchestrate the displayed user content based on the display of the multimedia production on the venue multimedia display system, when it receives a request from one of the user devices, generated by scanning one of the unique MRCs and/or NFC enabled tags with the user device, and provides the interactive content that corresponds, in real time, with the multimedia production currently being played on the venue multimedia display system.

In one embodiment, the present invention provides a system for displaying customized content to users at a venue via a user device. The system comprising a server system having a computer processor and a computer memory; a plurality of MRCs, each of the machine-readable codes encoding an address controlled by the server system, each of the MRCs being operatively mounted within the venue for access by the users in the venue. The server system performs the following steps: storing content in a database; collecting user data associated with the user; receiving a request from one of the user devices, the request being generated by scanning one of the MRCs with the user device; determining the user data associated with the user who scanned the MRC; selecting, based upon the user data, customized content from the content in the database; and delivering the customized content to the user device.

A further objective is to provide a system that enables a variety of interactions with the venue and the users attending an event at the venue, for increased entertainment, more effective sales at the venue, and more effective marketing. The objective of these interactions is to provide users individualized content that is based on multiple data points in order for content to be relevant to users on a personal level. Each scan of the uniquely encoded NFC enabled and/or MRC will allow the system to provide personalized content to the user, while generating user data that can be attributed to a specific user who scanned that MRC, or all past users who have scanned an MRC specific to a venue or seat and utilized to provide more relevant content during current and future use sessions. Furthermore, the personalized content is enabled by creation of a unique user ID that corresponds specifically to a user device, wherein content can thus be specifically tailored and modified independently to each unique user ID, and not simply to all users within the system. This allows for the use of user captured data to modify and update personalized content in a strategic manner.

A further objective is to provide a system that collects a large amount of effective marketing information and analytics, which is of great value to companies marketing to this audience.

Another objective is to provide a system that provides greater level of customization to the content being disseminated. The customization allows for capture of relevant data from the user device, the location, prior locations of the user device (e.g., as captured by GPS or other known locations where a user device accessed an MRC in the system), personal information given by a user, browsing habits and other data gathered from the user device, and other third-party API that have relevant data regarding the user or the user device.

In a further preferred embodiment, a method for delivering unique content to a user device via a MRC, comprising the steps of: detecting the MRC with the user device and determining an identification of a user, the user device, or both; determining whether the identification of the user device contains a unique mobile wallet certificate by querying a content management server; wherein if no unique mobile wallet certificate is identified, issuing the unique mobile wallet certificate to the user device; determining information about the user based upon the information connected to the unique mobile wallet certificate; customizing the content to said user based upon the identification of the user, the user device, or both; and delivering the content to the user device; wherein the content comprises a unique content offer.

In a further embodiment, the method further comprising: modifying the content based upon the occurrence of an event.

In a further embodiment, the method further comprising: wherein the unique mobile wallet certificate is created by making a determination on if a user and/or device in the server is unique, and if the answer is "yes," the content management server will request content from the content management system which includes an unissued, unique mobile wallet pass that is only offered one time to one user.

In a further embodiment, the method further comprising: wherein the MRC is selected from the group consisting of: a barcode, a quick response (QR) code, near-field communication (NFC) code, radio-frequency identification (RFID) code, or combinations thereof.

In a further embodiment, the method further comprising: wherein the identification of the user comprises identification of a data, wherein, upon each detection of the MRC, the data is updated.

In a further embodiment, the method further comprising: wherein querying a content management server comprises identification of a data corresponding to the unique mobile wallet certificate.

In a further embodiment, the method further comprising: wherein the data is selected from the group consisting of: a date, a time, a GPS location of the machine-readable code, a type of communication device used to scan the machine-readable code, an orientation of a communication device when the machine-readable code was scanned, a type of operating system on a communication device that scanned an MRC; and combinations thereof.

In a further embodiment, the method further comprising: wherein the customizable content directs the user device to a Web page, and wherein analytical data from the Web page is collected and consists of the data selected from the group consisting of: time spent on a Web page, purchases made, IP address, personal information input by the user, products viewed, and combinations thereof.

In a further embodiment, the method further comprising: wherein data is collected and aggregated every time a user accesses the content management server or the MRC.

In a further embodiment, the method further comprising: wherein the step of modifying the content is predetermined and stored within a database and is automatically created upon the occurrence of the event.

In a further preferred embodiment, a system for displaying a unique content to users at a venue via a user device, the system comprising: a server system having a computer processor and memory; a plurality of MRCs, each of the MRCs encoding an address controlled by the server system, each of the MRCs being operatively mounted within the venue for access by the user devices in the venue; and wherein the computer memory of the server system stores executable code, wherein when executed, enables the server to perform a process comprising the following steps: receiving a request from one user device, the request generated by scanning one of the MRCs with said user device; determining whether a unique mobile wallet certificate is associated with said device or generating a new unique mobile wallet certificate to the device that scanned the MRC; collecting a user data associated with the user device, wherein each user device comprises a unique mobile wallet certificate; selecting, based upon the user data, the unique content from the content in the database, wherein the customized content provides the unique content, wherein said unique content is stored within said server; providing the unique content to the user device; identifying the occurrence of an event; and generating a new unique content on said user device based upon the occurrence of the event that is unique to the unique certificate.

In a further embodiment, the system wherein upon each subsequent scan of the MRC, generating a new unique content within said server for delivery to the user device.

In a further embodiment, the system wherein the content is modified based upon an event performed on said user device.

In a further embodiment, the system wherein the content is a coupon.

In a further embodiment, the system wherein the coupon content is modified by a provider of said coupon.

In a further embodiment, the system wherein the event is selected from the group consisting of: an action in a game, a score in a game, a charitable donation, a purchase, a predetermined time, inventory, or combinations thereof.

In a further embodiment, the system wherein the MRC is printed on a surface.

In a further embodiment, the system wherein the MRC is embedded within a surface.

In a further embodiment, the system wherein the MRC identifies a specific location via a known location of the MRC, GPS, or both.

In a further embodiment, the system wherein the coupon is modified based upon sharing of the coupon to at least five additional user devices.

In a further embodiment, the system wherein the user data is updated upon the user device contacting the server system.

In a further embodiment, the system wherein the user data is selected from the group consisting of: a date, a time, a GPS location of the MRC, a type of communication device used to scan the machine-readable code, an orientation of a communication device when the machine-readable code was scanned, a type of operating system on a communication device that scanned an MRC; and combinations thereof.

In a further embodiment, the system wherein the customizable content directs the user device to a Web page, and wherein analytical data from the Web page is collected and consists of the data selected from the group consisting of: time spent on a Web page, purchases made, IP address, personal information input by the user, products viewed, cookies, pixels, and combinations thereof.

In a further embodiment, the system wherein the user device further receives in-venue metrics via an in-venue metrics API, and which said in-venue metrics are utilized as data or to modify the content.

In a further embodiment, the system wherein the user device further receives third-party metrics via a third-party metrics API, and wherein said third-party metrics are utilized as data or to modify the content.

In a further embodiment, the system ticket brokerage metrics via a ticket brokerage metrics API, and which said in-venue metrics are utilized as data or to modify the content.

In a further embodiment, the system wherein the data includes personal information added by a user.

In a further embodiment, the system wherein the MRC is located within an LCD/LED/e-ink display device embedded or affixed to seating surface.

In a further embodiment, the system wherein the MRC is displayed upon a video board located within the venue.

In a further embodiment, the system wherein the MRC is displayed within an LCD/LED/e-ink display which can be updated in real time.

In a further embodiment, the system wherein the event is related to an action performed by fan(s) in attendance of a game.

In a further embodiment, the system wherein the MRC is modified by the occurrence of an event.

In a further preferred embodiment, a system for generating a unique content to a user device comprising: a server system having a computer processor and memory; a plurality of MRCs, each of the MRCs encoding an address controlled by the server system, each of the MRCs being operatively mounted within the venue for access by the user devices in the venue; and wherein the computer memory of the server system stores executable code, wherein when executed, enables the server to perform a process comprising the following steps: receiving a request from one user device, the request generated by scanning one of the MRCs with said user device; directing the user device to a URL that is uniquely encoded to the MRC; receiving at an identification server, the URL request, and determining whether the user device is new or returning, and informing a content management server of the result; generating an unused mobile wallet certificate for a new user which is stored in a database; receiving an instruction at a content management server from a content management software regarding content to be generated; providing a second URL to the identification server; sending the second URL to the user device; displaying, from said second URL, unique content on said user device; obtaining a data from said user device; and upon the occurrence of an event, receiving a new URL from said content management server.

In a further preferred embodiment, a method for creating a unique digital coupon comprising: detecting a MRC with a user device and determining an identification of a user, the user device, or both; determining whether the identification of the user device contains a unique mobile wallet certificate by querying a content management server; wherein if no unique mobile wallet certificate is identified, issuing the unique mobile wallet certificate to the user device; storing, within a database, the unique mobile wallet certificate; generating a unique digital coupon, said digital coupon being unique to the unique mobile wallet certificate; and delivering the unique digital coupon to said user device.

Other features and advantages of the present invention will become apparent from the following more detailed description, taken in conjunction with the accompanying drawings, which illustrate, by way of example, the principles of the invention.

BRIEF DESCRIPTION OF THE FIGURES

The accompanying drawings illustrate the present invention. In such drawings.

DETAILED DESCRIPTION OF THE INVENTION

Figure 1:
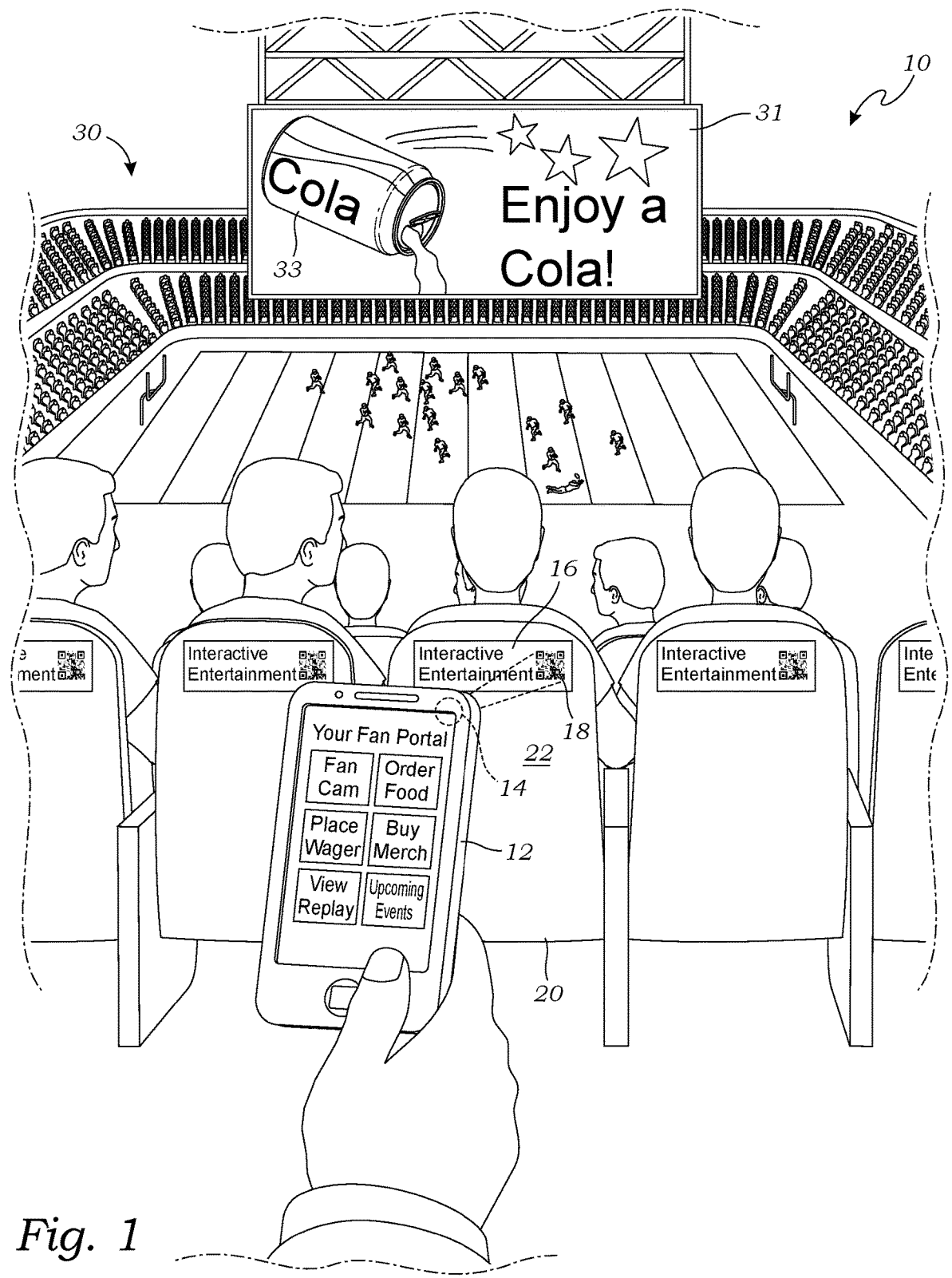
FIG. 1 is a perspective view of a venue that includes MRCs which may be scanned by a user device to initiate delivery of customized content.

The above described drawing figures illustrate the invention, a method and system for location based individualized content, wherein the system contains the ability to alter provided multimedia content based on data collected from user(s) input and other factors such as third-party data in real time. Content shall mean any content generated by the system and delivered to a URL or to the mobile device, or to a mobile wallet. The content may simply be visual content, a replay, an advertisement, or it may be a coupon or a redemption code or something of value.

As discussed in greater detail below, a differentiator of the system is that it uses data input from several variables in order to provide real-time content to the end user. These data sets can be from a multitude of sources such as ticket brokers, which can provide details on a user who purchased tickets to an event, to advertising database data, which can provide past content interactions from various sources on and off the Internet for a particular user. These analytical datasets can also be used to provide in-venue content or offers to users inside of an event on an individual basis, on a group basis, or to the venue as a whole venue based off of the collected data/feedback collected from users inside of the venue (i.e., if the analytics portal data reveals that 75% of users select hamburgers as their favorite type of food, the in-venue multimedia displays would be triggered to display content relevant to the selling of hamburgers). The system can also implement machine learning algorithms which, when coupled with a combination of some or all of the data provided from the analytics portal, can provide real-time content that is predicted to be favorable to the end user. The end user portal can be in various forms from browser-based Web pages, cloud-based Web apps, progressive Web apps, downloadable apps, etc. The system could provide multiple options ranging from ordering food, purchasing merchandise to be delivered to a seat location, viewing replay footage, to placing wagers inside of the stadium. The system would provide the ability to offer all MRCs on the system the same interactive content options, or to offer different content to users based on predetermined data sets or based on variables and data within the system.

In preferred embodiments, the MRC is unique and thus can have a known physical location if the MRC is on a stationary or static device. Where the MRC is affixed to a surface, such as a sicker, or secured into a surface, or engraved or otherwise physically imprinted on a surface, or embedded into a surface, the physical location can be defined when said item is stationary. Nonlimiting examples of fixed locations include: a fixed seat in a stadium, a bathroom, a particular restaurant, a wall, a post, etc. A mobile MRC may be located within a movable device, for example a vehicle, a bike, a boat, train, airplane, etc. An MRC on such movable devices will need to capture the GPS from the user device at the moment of capture to identify a location. A movable MRC can be accessed several times in a series of minutes and generated a different GPS location each time a user device scans the MRC (or queries a server) and allows the system to identify the movement of the user device.

Because of the known location of the MRC, whether static or movable, the precise location, or GPS location can be utilized as part of the data to generate content to the user device. Similarly, an API related to a vehicle can identify a starting location and an ending location of the vehicle trip, to the extent that one is available. Accordingly, the API can provide data to the system that identifies the planned route of the vehicle and content relevant to that particular location may be provided to the user along that route, which may be attractive to the user. Data from the views, page views, time spent on a page, advertisements viewed, or coupons downloaded by the user can provide further data regarding the habits or interests of the user and can be further utilized by the system to generate unique and individualized content to the user.

In certain embodiments, the system may be utilized in conjunction with a mobile wallet for wagering. In the event of a wagering component, users would be able to scan the NFC enabled and/or an MRC on a tag located on their seat or other location (e.g., seat/bench/chair/wall/railing/glass in front of them) with the user's device and be taken to a live wagering portal, which could be browser based or in the form of a cloud or locally based mobile application, including a progressive Web app ("PWA"). Using the systems analytics portal, the user would be able to see their past wagers across the entire system and place their wager utilizing a mobile wallet solution such as Apple Pay or Google Wallet, or through traditional payment methods. All of the interactivity and wager-based actions will be facilitated without the need for the user to create a traditional user profile. This same wagering configuration could be utilized to offer "brand wagers" wherein the prize given to the user is a physical item given to the user such as a promotional item from a team sponsor or a digital reward which can be downloaded or e-mailed to the user's device.

Fan engagement at sports venues often goes beyond the game itself. When the moment arises, fans are often generous to causes that are supported by their team, which may be provided to nonprofit organizations. Therefore, in a venue, the team may request support of one or more charities, and the platform could allow for the ability to donate money in real time directly from their venue seat via the NFC and/or MRC. For example, if the donation were to Salvation Army, the user would, either with or without prompting from the venue multimedia display system, scan their MRC and be prompted to donate money either using their mobile wallet or traditional payment methods. In keeping with the earlier claims, the system would allow venue owners to deploy various customizable donation templates to every seat, row, or section if desired. Additionally, after the donation transaction is complete, the user could be offered a physical or digital reward that could be used inside or outside of the venue. Indeed, the benefit of the system is that the user device contains a unique mobile wallet certificate (also known as a user ID) that is indicated in the system. Accordingly, this allows the system to identify a user device corresponding to a particular user ID as donating a certain dollar amount. The system can be prepopulated with "rewards" or incentives to donate or reach a cause.

For example, a cause may be for a single section of a venue to raise $100 for a cause. All donations originating from MRC within the particular section can then be aggregated to determine if the section reached the $100 donation goal. Accordingly, if there are 200 people in the section, a donation of an average of 50¢ would be sufficient to hit the goal. The system can then populate a predetermined digital or physical reward, i.e., a coupon or some other offer that can be used at the venue, or some other tangible or intangible reward. The system can go one step further as it can quickly tabulate the donations and, in real time, the system can allow sections to compete with one another. Thus, section 1 could "race" section 2, to reach a donation goal. This allows for gamification within the system based upon the use of MRC that are provided in a location.

Individual user rewards can be provided, for example, as a user makes a larger donation, that user is provided with a larger reward. Because the individual unique mobile wallet certificate allows for tracking of events, i.e., the donation by the user, individual rewards can be provided to that user, corresponding to that particular unique mobile wallet certificate.

All of these actions provide opportunities for the system to capture user data. The user data can remain anonymous to a large extent, as it is collected based upon the user's device scanning an MRC and not dependent on the user logging into the system. Therefore, data does not need to be correlated with the actual identify of the person controlling the user device. It is immaterial whether the user is male or female, or young or old, instead it is the particular set of data that creates a picture and certain mobile offers or content can be provided based upon that data, and then modified based upon the occurrence of one or more events, such as donations as above, or other purchases, or an outcome in an embedded game or task, or upon the outcome of the game at the venue, as nonlimiting examples.

Data can also be gathered outside of the system, for example, through a third-party API. The benefit of also utilizing user data that is gathered from outside of system itself is that it provides data that might not otherwise be gathered, while also offering an opportunity to "preset" content when a user scans the MRC at their seat. Example 1: If event ticket provider such as Ticketmaster, provided data to the system's analytics portal revealing that Joe purchased tickets to the football game to sit in seat 1, row 1, while also providing data, known to Ticketmaster, such as that Joe is a 32 year old male (data that is provided to Ticketmaster from Joe when he creates his Ticketmaster account), because each MRC in the system is uniquely encoded down to the individual seat or specific location, the analytics portal would have the ability to "preschedule" content that would appeal to a 32 year old male when Joe takes his seat at the game. This use case could be valuable for marketers looking to market to a particular subset of attendees, vs the entire stadium or venue. The data can be from more than just one event as well. If Joe has previously purchased other tickets from Ticketmaster, that data may also be available and provides further details and information relevant to Joe, which can be used to provide better content to Joe. If Joe only buys rock concert tickets, for example, providing country music listings for new concerts would not be the best targeted advertising for Joe—so modifying the content to that of Joe's interests (rock concerts) provides greater value for advertisers and also to Joe.

A machine learning component of the system would allow sports teams to provide more relevant real-time offers to fans by customizing content based on user interaction. Example 2: If Joe scans his MRC and is taken to the team fan portal where he selects "buy merchandise". 75% of the time Joe purchases a shirt, but he never buys a hat, then the system would have the ability to adjust Joe's offerings in real time to show him a larger selection of shirts, instead of hats, based off of his past purchase and browsing habits. Alternatively, the system could use this data stored on Joe's purchasing habits to deliver a customized digital offer to Joe to entice him to buy merchandise that is not a shirt such as a 25% discount if Joe buys a hat. This could be valuable to teams, performers, promoters, or venues looking to sell items from merchandise to food inside of the venue or based upon inventory considerations. The system has the ability to learn user characteristics from user input within various user portals mentioned above (Web browsers, PWAs, etc.). This component would provide a user with customized content based on their previous content interactions inside of one venue, or interactions across the entire system network of MRCs. It would also allow said system to store user and/or the user's device information in order to offer specialized incentives based on past usage statistics. For example, the system may reward Joe for scanning the MRC at his tenth straight baseball game by delivering an offer for "team VIP" merchandise. Or the system could provide Joe an offer for a hot dog, peanuts, or soda at a reduced rate based on his purchase history or incentivize him to make a purchase with a digital coupon or mobile wallet offer, if he typically does not purchase food or beverages.

Figure 4:
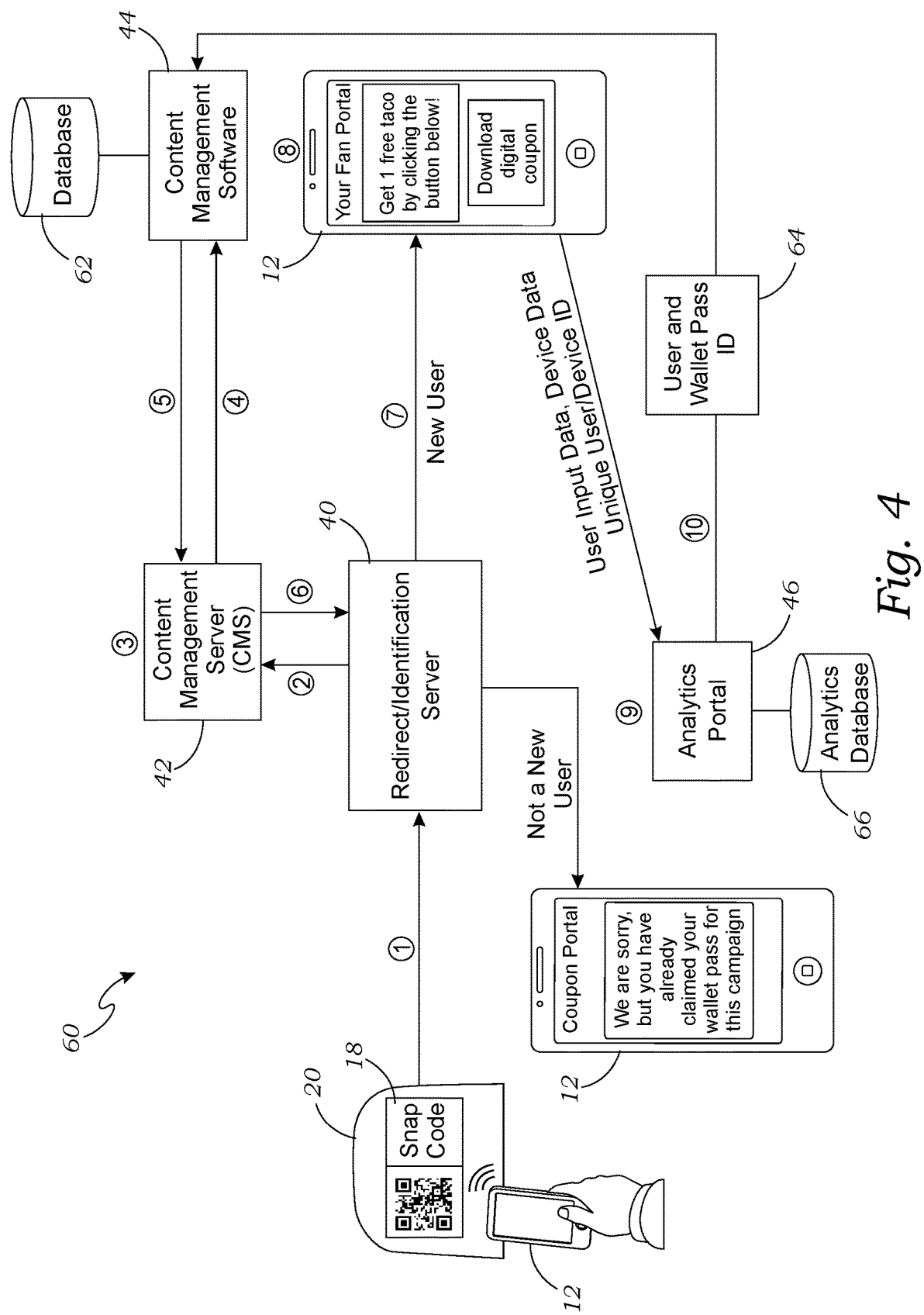
FIG. 4 is a block diagram illustrating a further embodiment of the system.
Figure 5:
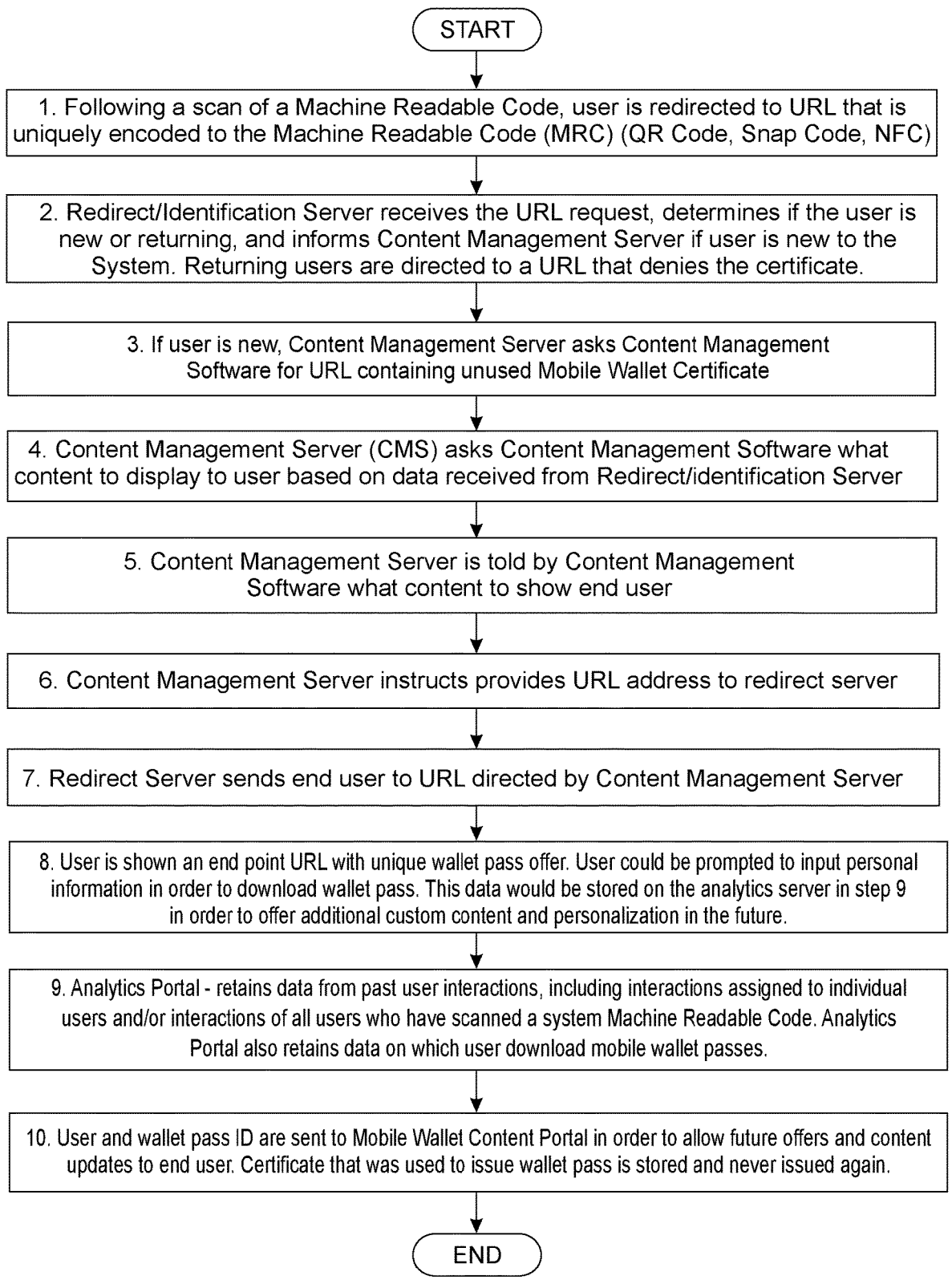
FIG. 5 is a flow diagram illustrating the operation of the system of FIG. 4.
Figure 6:
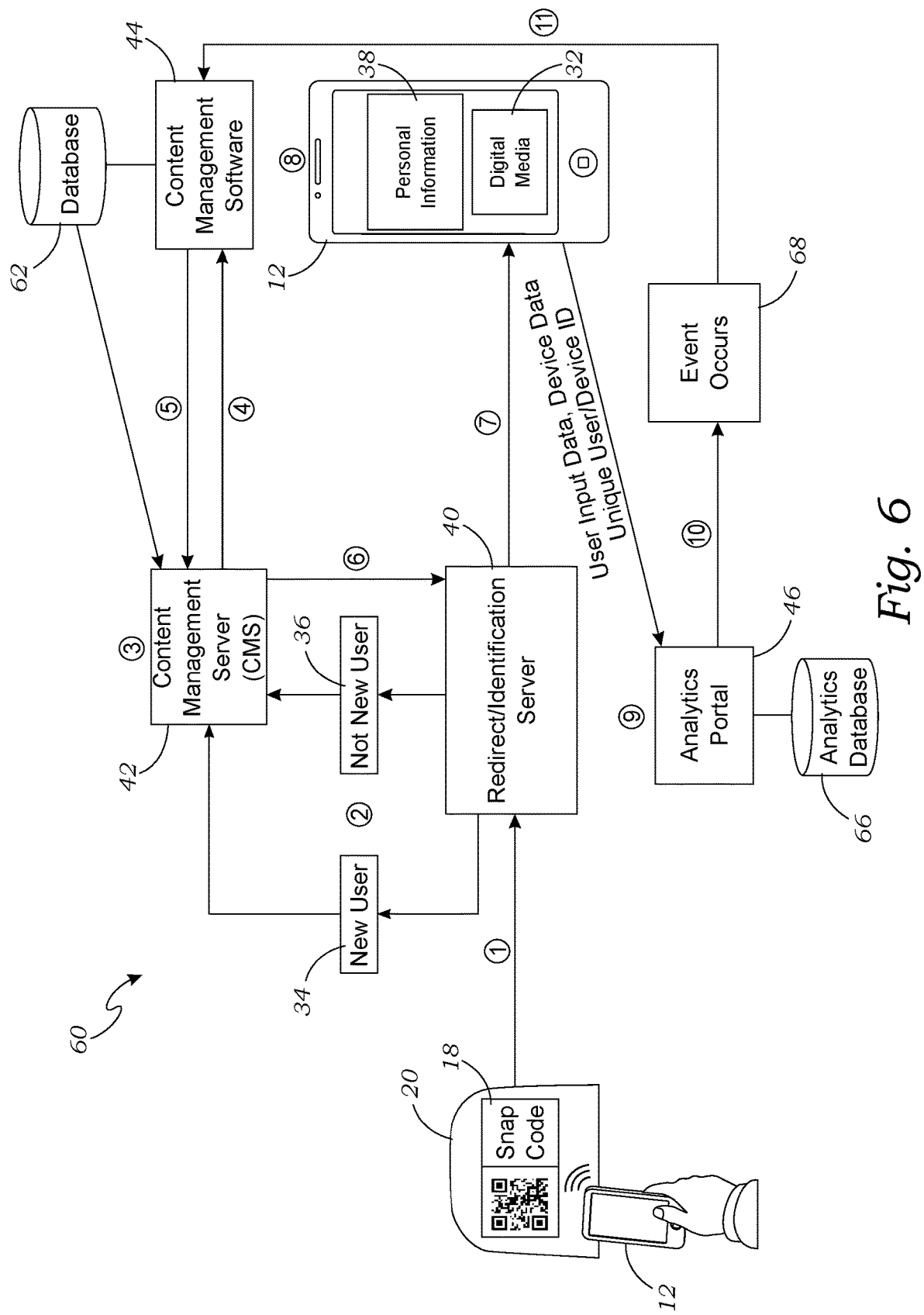
FIG. 6 is a block diagram illustrating a variation of an embodiment of the system.

Another feature of the system is the ability to offer unique identifications to each user device within the system. Thus, each user device can be tracked individually within the system. One example of this is to offer unique digital wallet offers, as shown in FIGS. 4-6, to each user device that scans one of the system's MRCs. This would allow venue owners, teams, universities, marketers, performers, promoters etc., to offer individualized digital wallet offers to every user device that scans an MRC. Example 3: The system offers unique digital wallet certificates for each user upon scanning the MRC, which means that if fifty users scan the same MRC with their user device, all fifty user devices will individually have a unique record within the system database. Thus, a single MRC could be located in a centralized location and would still allow for unique content (the digital wallet offer) to any user who scanned that MRC. The system might deliver a different digital wallet offer to each user so if Joe scans the MRC, his digital wallet offer might be for a half price soda at the concession stand, but if Joe's wife scans the same MRC from a different device, having a different unique mobile wallet certificate, her digital wallet offer might be for a half price hamburger at the concession stand. Likewise, the system will be able to track if a user activated and redeemed his or her digital wallet offer.

One mechanism to enact this is that the fifty users are taken to a URL, cloud-based application, or something of the like, and prompted to download a "digital wallet offer" every user who downloads said offer will have downloaded a mobile wallet certificate that is unique to their device, which also allows individual digital wallet offers to be updated individually (updates include content, imagery, discounts, etc.). The system creates this by providing a unique certificate for each mobile wallet, which is connected to a user device. This process is facilitated by the redirect/identification server making a determination on if a user and/or device that has entered the system is unique, and if the answer is "yes," the content management server will request content from the content management system which includes an unissued, unique mobile wallet pass that is only offered one time to one user. This can also be facilitated by storing a unique ID of the user device within a database in the system, wherein the software running on the system can query the unique ID and identify it from the records. Thus, the system can store the information regarding the individual user device (and store a unique code related to that device), or the user device itself can contain the unique mobile wallet certificate, or another form of a verified certificate in the storage of the user device, or the system can use both approaches. To the extent necessary, the unique ID may be stored in a distributed ledger system to ensure trust and accuracy with the system, which may be especially necessary where payments and other valuable personal information are stored.

The system would also contain the ability to offer "group passes" wherein the system could offer a digital wallet offer that was only able to be issued to a predetermined number of users. Thus, the first person, the first 5, the first 10, 25, 50, 100, 500, 1000, 10,000, nth, person to scan the MRC (and all numbers in between), may be included within a group. The distribution of such group passes and counting of executions of the system to a user device, can be used as a game or for other giveaway plans. It is common knowledge of the types of games where the "100th person to download wins a prize," or "only the first 100 people can claim a prize if they buy or click now." The ability to track these types of programming through the system provides a new way to manage such programs.

The system could also be implemented within a traditional mobile application or Web-based platform whereas the user would be offered the unique digital wallet offer once they visit said application or Web address. Because of the individualized nature of the unique mobile wallet certificate in the system, the unique digital wallet offer can then be directly modified based upon chance, some data, or event occurring which allows the provider of that unique digital wallet offer the opportunity to modify an offer. For example, an offer is for 10% off a pizza, but the offer becomes 25% off once the offer is shared with at least 2, 5, 10, 25, 50, n number of people, who also download an offer. This allows tracking of who downloads an offer, how many are tracked to a particular offer, and allows for modification and improvement of an offer based on metrics related to sharing.

The machine learning and custom content aspect of the system is not limited to in-venue applications and can be utilized across multiple industries such as rideshare vehicles, aircraft, ships, trains, hotel rooms, dorm rooms, vacation rentals, etc. The broad spectrum of the invention is to offer location based custom content solutions to user's mobile devices.

In the case of hotels and collegiate dorm rooms, the system would be comprised of a plurality of uniquely encoded tags comprising an MRC placed inside of guest rooms whereas there is one NFC enabled and/or MRC tag per room, or one per guest/resident of said room. Each MRC would be connected to system servers which would allow said tags to offer predetermined content based on pre-supplied data points. In the collegiate dorm use case, users would scan the MRC located within their room and be shown content based on various factors such as their gender, education major, year of schooling, etc. The content on these MRCs would also utilize data points and usage reports from the system itself to better serve users with relevant content. These MRCs could also allow marketers, and the university at which they are deployed, to offer incentives such as game tickets or retail store coupons, directly to the students in their dorms via a digital offer or mobile wallet offer, while providing the option to provide the offers and content to only select, or all, MRCs based on various analytics provided within the system. MRCs would also allow students and hotel guest to offer real time feedback on the system in the form of user submissions to conduct live polling procedures. This use case would provide a valuable platform for universities, marketers, and hotel owners to offer customized content to their guest on an individualized basis.

Another unique feature of the system is that the data that is collected in order to provide content can be gathered system wide when a user scans one of the plurality of MRCs in any location. This feature would allow marketers to understand consumers characteristics more closely from a location experience, and to provide the user relevant content across a multitude of markets. Example 4: If an MRC is scanned by Joe at a football game in Arlington on a Sunday, and then an MRC is scanned by Joe in a rideshare vehicle in Boston the following Wednesday, the system would understand that the user, Joe, was the same for both interactions, without Joe having to log into the system, and display content accordingly based on data provided from the analytics portal. This is because the system knows the user, Joe, because of the unique mobile wallet certificate either on the user device or on the server, or both. By scanning a MRC, the system can also upload data to generate more information Joe and his activities and interests, so as to provide better content to Joe through the content.

FIG. 1 is a perspective view of one embodiment of a venue (30) that includes MRCs (18) positioned within the venue (30) to be scanned with a user device (12) to initiate delivery of customized content to the user device (12), as discussed in greater detail below. The venue (30) may be any form of stadium, arena, field, competition area, performance hall, etc., for which this system (10) might be suitable. Here the venue includes a jumbo screen (31), which may display certain MRC, or advertisements tied to an individual MRC. Here, an advertisement regarding soda company (33) is provided. Such occurrence may generate an MRC related to that product, enabling a user to download or obtain a coupon or offer related to that particular product. The system (10) can be implemented in entertainment venues, as well as other areas where mobile engagement is desired and/or required, such as college dorm rooms, hotel rooms, cruise ships, trains, aircraft, rideshare vehicles and the like. While some examples of the uses of this system are discussed herein, the scope of the present invention should not be limited to the specific examples provided, and the term "venue" should be construed to include alternative or equivalent embodiments which could be devised by one skilled in the art.

Figure 2:
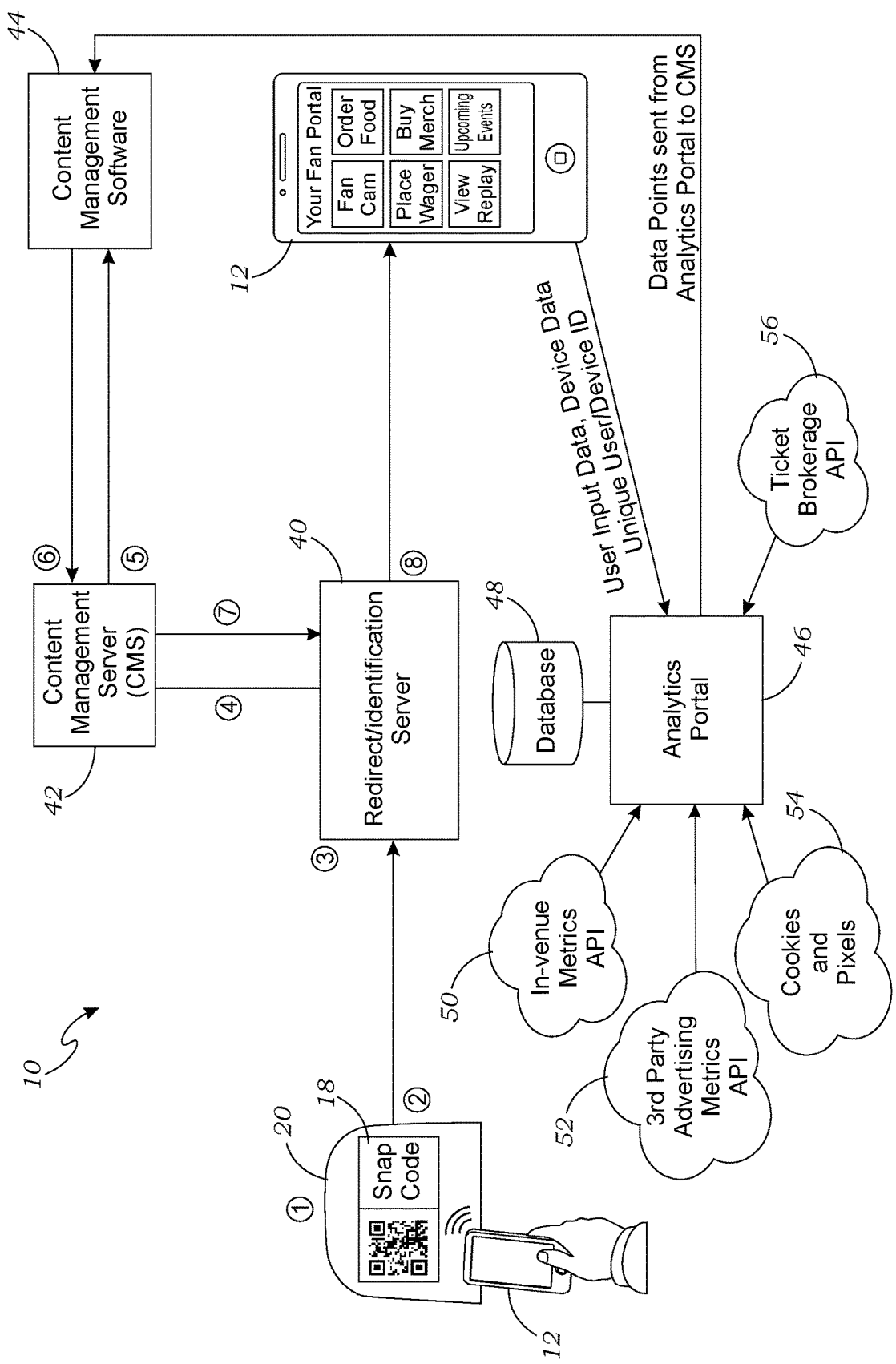
FIG. 2 is a block diagram of one embodiment of a system that enables delivery of the customized content, as illustrated in FIG. 1.

In this embodiment, a user device (12) (e.g., mobile electronic device, such as a smart phone, tablet, smart watch, smart glasses, wearable device, or implantable device) may be used to scan or otherwise detect one of the MRCs (18) to enable a system (one embodiment of which is shown in FIG. 2) to provide interactive content to the user device (12). This may be performed by placing the user device (12) adjacent an NFC chip contained within the tag (16), or by using a camera (14) of the user device (12) to capture an image of the MRC (18), so that the QR code (or other form of code)

is captured. The user device (12) is then directed to content, as discussed in greater detail below.

As shown in FIG. 1, in this embodiment, the plurality of MRCs (18) are each part of a tag (16) positioned adjacent one of a plurality of seats (20) in the venue (30), in this case on a back surface (22) of the seat (20) in front (or a wall, etc., if no seat is in front). The MRCs (18) could alternatively be placed in other locations (e.g., the ground, ceiling, walls, pillars, other surrounding structures, or other locations on the seat (20) such as the arm rest or cup holder). While one example of this placement is illustrated, this should be broadly construed to include any placement in the venue that is suitable for use as described herein. Alternative placement schemes that may be devised by one skilled in the art, consistent with the teachings of the present invention, should be considered within the scope of the present invention. The tag (16) itself may be a video display, such as LCD, LED, e-ink, or other visual display, which can be modified on a live basis. The MRC (18) can thus be modified and updated in real time. The tag (16) may also be embedded and utilize, as the MRC (18), RFID or other wireless transmission instead of a camera (14) to read and communicate with the MRC (18).

Each of the MRCs (18) encodes an address that will direct the user device (12) to a redirect/identification server (40) (shown in FIG. 2), as discussed in greater detail below. For purposes of this application, the term "machine-readable codes" or MRC, should be broadly construed to include any form of barcode, quick response (QR) code, near-field communication (NFC) code, radio-frequency identification (RFID) code, or any other equivalent device or technology known in the art, or later developed. It may be in the form of a separate piece of material (e.g., metal, plastic, etc.) that is installed in the venue (30), or it may be printed or otherwise provided within the venue (30) (e.g., displayed, printed on, or integrally formed with one of the seats, or other surfaces or structures of the venue).

The MRCs (18) are adapted to be read by a user device (12), typically a mobile "smart" phone, although alternatively any form of laptop computer, tablet computer, personal digital assistant (PDA), netbook computer, smart watch, smart glasses, wearable device, or implantable device, and the like using wireless communication, a camera, or other connectivity element between the user device and the MRC. The MRCs (18) can be programmed to automate tasks, such as, for example, to change phone settings, create and send a text, launch an application, or any number of commands to be executed, limited only by the communication device.

The system (10) (shown in FIG. 2), as discussed in greater detail below, may be programmed to allow, for example, advertisers, team owners, promoters, performers, and the like to direct the individuals to a specific Web page, or have the user device (12) perform a specific action when the MRCs (18) are scanned by the user device (12) (i.e., by a camera [14] of the user device [12]), or using a radio or other wireless communication to connect to a nonvisible MRC (18). While some other particular examples are discussed below, it should be understood that countless alternative systems may be implemented using this system (10), and such alternatives should be considered within the scope of the present invention.

In other embodiments, the MRCs (18) may allow individuals to perform contactless transactions such as, for example, purchase tickets, order meals, and shop for merchandise directly from their seat while inside the event facility. In a typical embodiment, the plurality of MRCs (18) are encrypted with data that can be updated remotely on a real time basis via, for example, a URL redirect page, or by sending and launching an application ("app"). In addition, in a typical embodiment, the plurality of MRCs (18) are linked together and viewed as a network rather than individual MRCs (18). However, the autonomy of each individual MRC (18) is maintained, allowing contactless transactions and delivery to a specific location, i.e., to a seat, based upon the particular MRC that was scanned.

In the embodiment of FIG. 1, the MRCs (18) may be provided on rigid plates or stickers, and/or containing NFC chips or other similar chips and are programmed to perform individually designated actions. For example, NFC codes can be programmed to automate tasks such as, for example, allowing for a change of phone settings, a text to be created and sent, turn on device via Bluetooth, and the like. While this may be effective in some cases, such individually designated actions are not optimal for event facilities where a different message may need to be delivered at various times throughout an event. In a typical embodiment, the exemplary system and method allows the plurality of MRCs (18) to be programmed to perform various designated actions allowing operators of the event facilities to cater personalized messages to specific sections or individual seats within the event facility rather than one designated action for the entire event facility.

For example, if the event facility is a sports stadium, as shown in FIG. 1, the plurality of MRCs (18) can be prompted to swipe or scan the user device (12) on the seat in front of them, via NFC, QR code, etc., to receive content. In other embodiments, upon swiping or scanning the user devices (12), the individuals may be directed to a different advertiser's Web page at certain times in the game so that multiple different advertisers can utilize the plurality of MRCs (18) during the game. In other embodiments, the plurality of MRCs (18) may also have the ability to download a digital coupon onto the communication devices which could be redeem at a concession area or retail location. The MRCs (18) also have the ability to be synced to live media that will run on digital screens within the venue via scheduling software, as discussed in greater detail below.

Another use for the invention would be for retailers to offer real time discounts to users in specific venues via the MRCs (18). For example, if the MRCs (18) inside of the venue (30) are linked to a specific retailer, then that retailer could offer discounts in real time that could only be accessed by users inside of the venue (30). The occurrence of a real time discount is an event, wherein the event triggers a modification of an offer or of the content that is provided to the user device (12).

Mobile payment is a rapidly expanding business segment and NFC applications such as, for example, contactless transactions are expected to be the most widely adopted form of mobile payments. Embodiments of the invention provide individuals an ability to establish radio communication between their communication devices and the plurality of MRCs (18) by touching them together or bringing them into close proximity, via NFC, usually no more than a few centimeters.

Embodiments of the invention also provide individuals an ability to establish interactive communication via MRC. In a typical embodiment, the plurality of MRC can be programmed to perform various designated actions such as, for example, an ability to download a mobile wallet offer (e.g., a digital coupon) straight onto the user devices (12) which could be redeemed at a concession area or retail location. For example, the mobile wallet offer could be redeemed by the individuals upon performing a transaction at a retail or concession area using, for example, the NFC enabled communication device. This provides concession owners, retail owners, and advertisers an ability to immediately see conversion rate of a coupon that is issued (i.e., 100 coupons were scanned via the plurality of MRCs and 80 were redeemed). These mobile wallet offers could be redeemed at retail locations inside or outside of the event facility.

In a typical embodiment, each tag (16) contains an MRC (18) and each of the MRCs has a unique identification number that is stored within a database allowing specific interaction with this MRC (18), including knowing its specific location, or to provide a specific message to be delivered to each of the plurality of MRCs (18) within the event facility at a given time. This provides individuals an ability to order meals and have their meals delivered to their seats by scanning their communication devices against the plurality of MRCs and being directed to a Web page, and the specific location of the MRC is known. This is especially useful providing the fact that this can be accomplished via a standard mobile Web browser vs requiring the user to download an application onto their mobile device.

Along with remotely updating the plurality of MRCs (18) by utilizing URL redirecting technology, the exemplary method and system is configured to collect and aggregate analytical data every time an individual scans the plurality of MRCs. When the plurality of MRCs (18) is scanned with the user devices (12), analytical data is collected. The analytical data may be, for example, date, time, GPS location of an MRC, GPS location of a user device (12) when it scanned an MRC, the type of user device used to scan a machine-readable code, orientation of a communication device when a machine-readable code was scanned, and type of operating system on a user device that scanned an MRC. The exemplary method and system couple the collected analytical data from the physical scanning of the plurality of MRCs (18) with data collected once the individual is directed to the Web page. In a typical embodiment, the data may be, for example, time spent on a Web page, purchases made, IP address, personal information input by the user, and products viewed. Such data is of high value to, for example, advertisers, team owners, and venue owners as it provides a large insight into consumers purchasing and Web browsing habits. This embodiment could also be used to allow for real time data/polling of event attendees, i.e., voting for your favorite player, predicted outcome of the game, predicted score, games displayed on a jumbotron, real-time events at the stadium, etc. However, the real-time polling is enabled by the individualized nature of both the user device and also of the MRC. For example, where only one of the user devices or the MRC is unique, it is impossible to identify both the user and also a population of similar users. If a section of a stadium is competing against another section, we need to have each user device connect to an MRC in their particular section, and then participate in an event as a group. If the group element is missing, such "sectional" competition would not be possible.

In a typical embodiment, remotely updatable machine-readable code programming provides an ability for individuals to download digital coupons directly to their user devices and transfer the digital coupon to other user devices. In a typical embodiment, once the individual transfers the digital coupon to a predefined number of user devices, the incentivized offer increases. For example, upon brining their user device in close proximity to a machine-readable code, the individual may be directed to a Web page from where the individual downloads a mobile wallet offer that is a digital coupon for 10% off at a local retail store. The system uses the unique mobile wallet certificate; therefore, this digital coupon is now unique to the user device and must be in order to track the sharing of the coupon. If the individual transfers the digital coupon from his/her communication device to, for example, five other communication devices within a fixed time period such as, for example, a week, the coupon offer automatically upgrades from 10% to 20% off at the local retail store. This capability offers further incentive for individuals to transfer their digital coupons to family and friends so that they will receive greater discounts. Also, this capability will allow brands and retailers to watch their promotion go viral from a first point of download to various locations where the coupons are transferred between various user devices. These coupons/promotions could also be shared and tracked via NFC, MMS, Text Message, social media such as Facebook, Twitter, Snapchat, etc. Mobile coupons could be browser based or stored into user's digital wallet located on their user device.

A coupon may only appear upon the occurrence of some event. For example, the end of the game, one team winning, one team scoring a predetermined number of points, a particular game event (a touchdown, a homerun, a stolen base, a 3-point shot, etc.), and would generate an MRC which can provide the content, i.e., a coupon for some opportunity. These events may be prepopulated into the system so that they are ready upon the occurrence of the event.

In other embodiments, the remotely updatable MRCs (18) may be included into identification badges such as, for example, student identification badges, employment identification badges, concert badges, and the like. For example, the inclusion of the MRCs (18) in the student identification badges provides an ability to students to scan their identification badges and be automatically redirected to a Web page that would show what is being served for lunch, sports schedule, and the like. The Web page may also include advertising that may be changed on a daily basis. Additionally, according to some embodiments, the MRCs (18) may be included into, for example, magnets that parents could place in their house, cars, and the like. The magnets with MRCs (18) could be scanned with communication devices to access information such as, for example, grades, school information, and the like. For example, the inclusion of the MRCs (18) within concert credential codes would allow fans to scan the machine-readable codes in order to get exclusive content, offers, etc. In other embodiments, a machine-readable code, attached or not attached, to a lanyard, would be handed out to every attendee of a concert. While at said concert, the fan could scan their machine-readable code for a chance to win backstage passes, merchandise, etc. Any data input from said fan would also be collected in real time. These MRCs (18) could also be placed on merchandise, such as but not limited to, shirts, hats, CD's, sweatshirts, pants, posters, etc.

Furthermore, various embodiments are described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, devices, or any similar or equivalent arrangements known to those skilled in the art. Accordingly, the various embodiments may take the form of an entirely hardware embodiment, an entirely software embodiment or an embodiment combining software and hardware aspects. The following detailed description is, therefore, not to be taken in a limiting sense.

In addition to the data discussed above, it is also possible for the system, as discussed below, to gather a large amount of data about the user, from various sources, to further enable customization of the content provided. This is discussed in more detail below.

Figure 3:
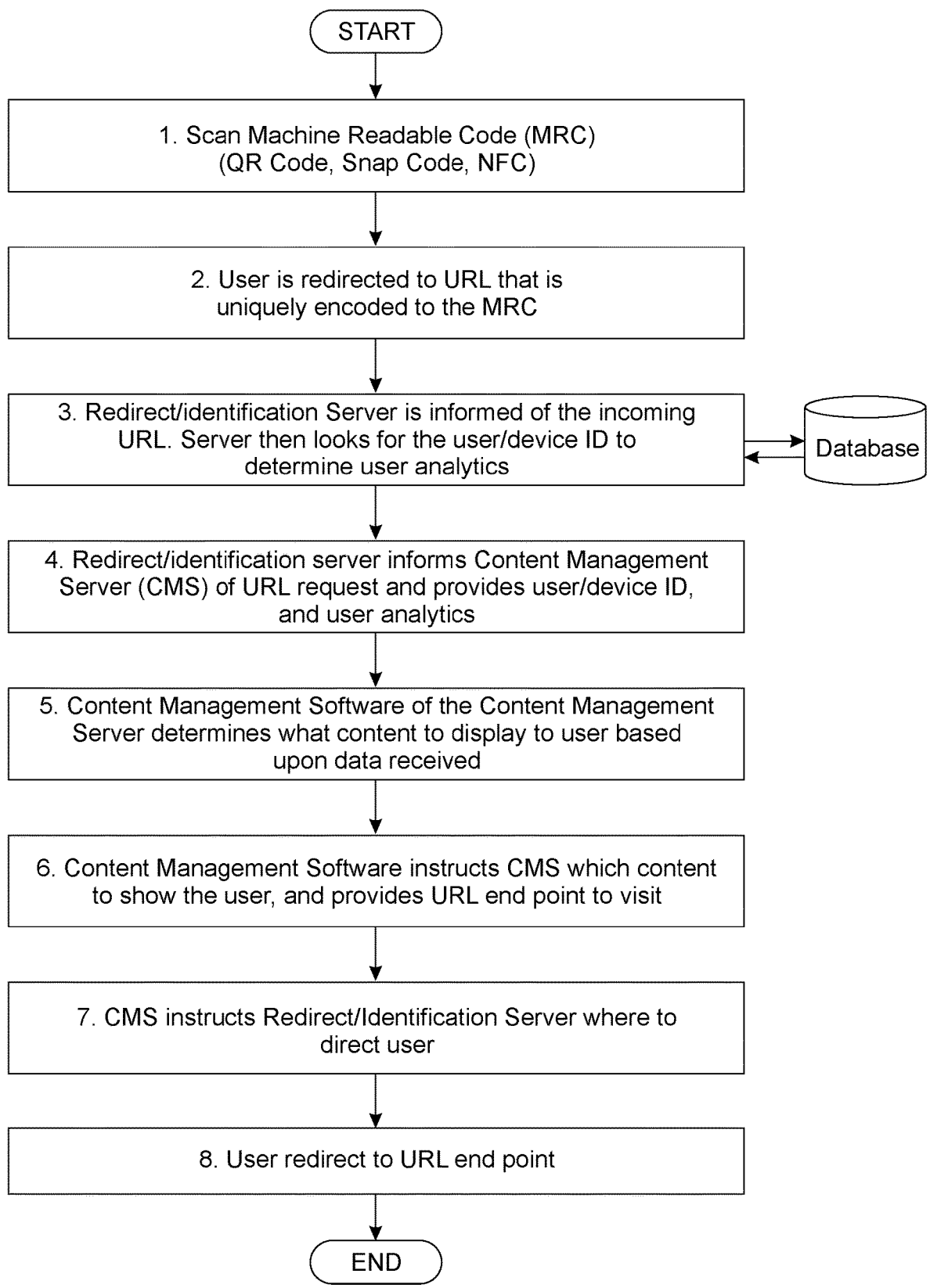
FIG. 3 is a flow diagram illustrating the operation of the system of FIG. 2.

FIG. 2 is a block diagram of one embodiment of a system (10) that enables delivery of the customized content, as illustrated in FIG. 1. FIG. 3 is a flow diagram illustrating the operation of the system (10) of FIG. 2 in eight steps. As shown in FIGS. 2-3, in this embodiment the system (10) includes a redirect/identification server (40) that is operably connected to a network (e.g., Internet, or other form of network known in the art). For purposes of this application, the term "server" (or any other similar term, such as "computer," "computer device," "electronic device," "user device," "portal," etc.), refer to any form of electronic device or plurality of devices having at least one computer processor, e.g., a central processing unit (CPU), and some form of computer memory having a capability to store data, as is well known in the art. The server may comprise hardware, software, and firmware for receiving, storing, and/or processing data as described below. The hardware may be in a single unit, or operably connected via a network. For example, a computer or server may comprise any of a wide range of digital electronic devices, including, but not limited to, a server, a desktop computer, a laptop, a smart phone, a tablet, a smart watch, smart glasses, a wearable device or an implantable device or any form of electronic device capable of functioning as described herein. Furthermore, while multiple devices may be described (e.g., a content management server (42), an analytics portal (46), and others), these may all be performed on a single computer device, or multiple associated computer devices, according to the teachings of one skilled in the art.

The term "computer memory" as used herein refers to any tangible, nontransitory storage that participates in providing instructions to a processor for execution. Such a medium may take many forms, including but not limited to, non-volatile media, volatile media, and any equivalent media known in the art. Nonvolatile media includes, for example, ROM, magnetic media, and optical storage media. Volatile media includes, for example, DRAM, which typically serves as main memory. Common forms of computer memory include, for example, hard drives and other forms of magnetic media, optical media such as CD-ROM disks, as well as various forms of RAM, ROM, PROM, EPROM, FLASH-EPROM, solid state media such as memory cards, and any other form of memory chip or cartridge, or any other medium from which a computer can read. While several examples are provided above, these examples are not meant to be limiting, but illustrative of several common examples, and any similar or equivalent devices or systems may be used that are known to those skilled in the art.

Furthermore, the term "database" as used herein, refers to any form of one or more (or combination of) relational databases, object-oriented databases, hierarchical databases, network databases, nonrelational (e.g., NoSQL) databases, document store databases, in-memory databases, programs, tables, files, lists, or any form of programming structure or structures that function to store data as described herein.

The computer memory of the redirect/identification server (40) stores executable code that, when executed, enables the computer system (10) to perform a process that comprises multiple steps, such as the process shown in FIG. 3. As described in FIG. 3, the process is initiated when the user device (12) is used to scan (or otherwise detect or read) the MRC (18) in the venue (30) (as shown in FIG. 1), such as placing the user device (12) adjacent the NFC chip, or using the camera (14) (shown in FIG. 1) of the user device (12) to capture an image of the MRC (18) that may located on seat (20), so that the QR code (or other form of code) is captured. The user device (12) then sends a request to the redirect/identification server (40), to a unique URL encoded in the code. When the redirect/identification server (40) receives the inquiry, the redirect/identification server (40) is able to determine a user/device ID that identifies either the user, the device used, or both. This information is captured and may be used in many ways to determine further information about the user who is scanning the MRC (18). This information is used later, as discussed below, to customize the content being delivered to the user device (12).

The redirect/identification server (40) delivers this information to the content management server (42) ("CMS"). Content management software (44) operably installed on the CMS (42), then uses the user data to determine what content to deliver to the user device (12), based upon the user data received. The content management software (44) may draw data about the user from multiple potential sources, which may be collected, for example, by an analytics portal (46), and which may be stored in a database (48). The analytics portal (46) may be a server, or device allowing communication, capture, decision making, etc., in order to receive the various input, as detailed in FIG. 2. In one embodiment, the step of receiving a user ID/device ID from the user device provides significant data about the user. For example, the user ID may enable the direct collection of data about the user, from multiple sources. The device ID may be connected with the user, via records from the service provider, and therefore enable collection of data about the user. This data allows for modification of unique content generated to a mobile device in real time, or upon a subsequent scan of an MRC by the user device.

The step of collecting user data associated with the user may also include the step of receiving in-venue metrics via an in-venue metrics API (50). This API (50) may enable information about the user to be gathered based upon purchases of tickets (past and present), purchases of food, merchandise, and other goods and services from the venue.

The step of collecting user data associated with the user may also include the step of receiving third-party metrics via a third-party metrics API (52). This API (52) may enable information about the user to be gathered from third parties who participate in a shared program, or who sell or otherwise provide marketing information, demographics, and other data about the user.

The step of collecting user data associated with the user may also include the step of receiving information from tools (54) such as cookies, pixels, and similar tools. Therese tools (54) enable information about the user based upon activities of the user on the current system (10), as well as related screen time, such as browsing the Internet, using other sites and software, etc.

The step of collecting user data associated with the user may also include the step of receiving information from ticket brokerage metrics via a ticket brokerage metrics API (56). These metrics may include information gathered by the ticket brokers who sell tickets at the venue (30) (in FIG. 1), and may include a wide range of marketing data, not only about ticket purchases made, but also related information about the user.

In this embodiment, the content management software (44) determines content instructions, based upon the user data that is gathered, and relays those content instructions to the Content Management Server (42), the Content Management Server (42) then instructions the Redirect Server (40) of which URL should be displayed to the user, and the Redirect Server (40) then directs the user device (12) to the final end point (application, URL, etc.). The user device (12) then arrives at the end point and displays the mobile content to the user. Content can be modified by any number of events. For example, a restaurant at a sporting venue may want to discount food (so none is wasted at the end of the game) and selling food for discount when a specific time point in the game or event is reached. This allows for real-time feedback within the event and within the system of inventory, wherein price or an offer can be modified based on the particular inventory. An advertisement or coupon can be generated as mobile content in real time to users on the system to incentivize such consumption. For purposes of this application, the terms "real time" and "real-time" means any interactions that are provided within ten seconds of an event occurring.

The step of providing the interactive mobile content may also include the steps of selecting and/or generating the desired content, suitable for the particular user, in a format for use in a mobile application, and transmitting the mobile application and the desired content to the user device (12). In one embodiment, the system (10) utilizes a cloud-based application. For the cloud-based app to work, an application (or "app") is written (in a suitable format for iOS, Android, etc.), the app is then either loaded onto a cloud-based platform or ported into a cloud-based OS. Once in the cloud platform, the app can be accessed from a mobile device and displayed as if it were running natively on the user device.

FIG. 4 is a block diagram illustrating a second embodiment of the system (60); and FIG. 5 is a flow diagram illustrating the operation of the system (60) of FIG. 4 in a ten-step diagram, as indicated by the circled numbers in the flow diagram. As shown in FIGS. 4-5, the system (60) includes many of the same components discussed above, including the redirect/identification server (40), the content management server (42), and the analytics portal (46). The function of these components in this embodiment, however, includes alternative steps, as discussed in greater detail below.

In this embodiment, following a scan of the MRC (18) with the user device (12), the user is redirected to a URL that is uniquely encoded to the MRC (18). The redirect/identification server (40) receives the URL request and informs the content management server (42) whether the user device (12) is new or a returning device into the system (60). In this embodiment, the content management server (42) includes a database (62) of URLs containing unique certificates used to issue mobile wallet passes. The wallet passes may be limited to a single use by each user. If the user is determined to be a returning user, this user may be denied access to the mobile wallet pass, to ensure that a user does not access multiple rewards. If the user is new, the content management server (42) determines, via the content management software (44), a URL containing an unused mobile wallet certificate, taken from the database (62). The content management software (44) determines what content to display based upon data received from the redirect/identification server (40), and the content management software (44) provides a URL address to the redirect/identification server (40), which provides the URL address to the user, so that the user device (12) is directed to the selected end point. The content provided includes a unique wallet pass offer. The system then, through the analytics portal (46), retains the data from past interactions. The user and wallet pass ID (64) (mobile wallet certificate) is sent to update the portal and databases.

As part of this process, the user could be prompted to input personal information in exchange for the wallet pass. The provided information could be stored in an analytics database of the analytics portal (46). The analytics portal (46) retains data from past user interactions, including interactions assigned to individual user and/or interactions of all users who have scanned machine-readable code (18). The analytics portal (46) also retains data on which user downloaded the mobile wallet passes.

The user and wallet pass ID's are sent, through the CMS to the database (62) to allow future offers and content updates to the user. The certificate that was used to issue the wallet pass is stored and never used again.

Figure 7:
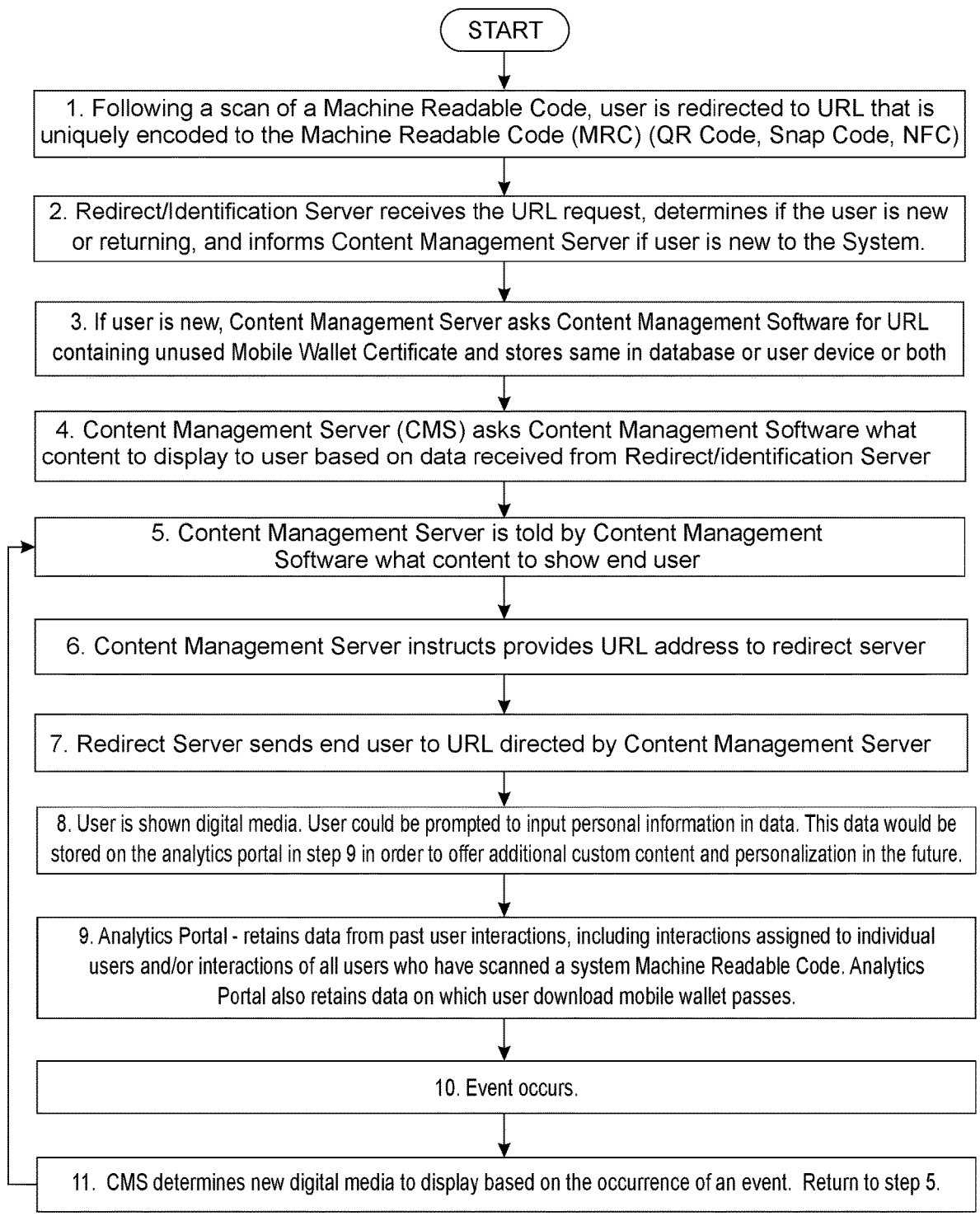
FIG. 7 is a flow diagram illustrating the operations of the system of FIG. 6.

FIG. 6 details a variation of the above, and a flow diagram of FIG. 7 in eleven steps, wherein a user device (12) accesses an MRC (18) on a seat (20). Following a scan of the MRC (18) with the user device (12), the user is redirected to a URL that is uniquely encoded to the specific MRC (18). The redirect/identification server (40) receives the URL request and informs the content management server (42) and determines the status (new or not new) of the user device (12) to the system (60), by checking for a user ID and Wallet Pass ID (mobile wallet certificate) from the database (62). New (34) user device or a not new (36) user device are simply determined by checking the database (62) for a corresponding ID.

The content management server (42) includes a database (62) of URLs containing unique certificates used to issue mobile wallet passes. If the user is determined to be a returning user (36), the database confirms the ID (certificate). If the user is a new (34) user, the content management server (42) determines, via the content management software (44), a URL containing an unused mobile wallet certificate, taken from the database (62), and records the same within the database. At this point, the user is confirmed with an existing ID (certificate) (64) or possesses a new ID, in either case, the certificate being specific to that user device (12).

Subsequently, the unique mobile wallet certificate (ID) being confirmed or generated, the content management software (44) determines what content to display based upon data received from the redirect/identification server (40), and the content management software (44) provides a URL address to the redirect/identification server (40), which provides the URL address to the user, so that the user device (12) is directed to the selected end point. The content provided includes a unique wallet pass offer, for example, in the form of a digital coupon (32).

As part of this process, the user could be prompted to input personal information (38) into the system (60), which allows for better analytic information on the user device (12). The provided information could be stored in an analytics database (66) of the analytics portal (46). The analytics portal (46) retains data from past user interactions, including interactions assigned to individual user and/or interactions of all users who have scanned MRC (18). The analytics portal (46) also retains data on which user downloaded the mobile wallet passes.

The analytics database (66) can also be utilized to modify the digital wallet offer, for example the digital coupon (32), based upon the outcome of a live event, or based upon the actions taken by a user. For example, the event (68), may be that a home team wins a game. Upon the occurrence of the event, which was prepopulated within the database, the analytics portal (46) can modify the digital coupon (32). Thus, the digital coupon (32) first provided for a free drink with an order of a slice of pizza. Upon the occurrence of the event (68), the digital coupon (32) now provides a free drink and salad with the order of a slice of pizza.

Another example of an event (68) may include: making donation, making a wager, playing a game within the (60), a predetermined lottery, the purchase of an item within the system, the purchase of an item outside of the system (60), but tracked via an outside API that connects to the system (60). Because of the individualized ID, we can track and identify each user device (12) and allow for customized communication based upon the occurrence of the event (68).

While certain embodiments of this invention are disclosed in this specification, it is to be clearly understood that the invention is not limited to these embodiments, but rather the scope of the invention is defined by claims made to the invention. As used in this application, the words "a," "an," and "one" are defined to include one or more of the referenced items unless specifically stated otherwise. The terms "approximately" and "about" are defined to mean±10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A method for delivering unique mobile content to a user device via a machine-readable code comprising the steps of:
   a. scanning, by the user device, the machine-readable code and determining an identification of a user, the user device, or both;
   b. determining whether a unique mobile wallet certificate is associated with said user device by querying a content management server, and if no unique mobile wallet certificate is associated therewith, issuing a new unique mobile wallet certificate to the user device;
   c. collecting user data associated with the user device wherein the user device has an associated unique mobile wallet certificate;
   d. selecting, based on the user data and the unique mobile wallet certificate associated with the user device, unique mobile content stored in a database;
   e. providing, by the content management server, the unique mobile content via a uniform resource locator (URL) to the user device;
   f. receiving a user event occurrence input from the user device caused by sharing of the URL by the user by the user sending the URL to another user device, wherein the user event occurrence input defines an event occurrence that is unique to the unique mobile wallet certificate associated with the user device;
   g. in response to receiving the user event occurrence input, generating, by said content management server, a second URL corresponding to a new unique mobile content specifically for the user and providing the new unique mobile content to the user device;
   h. wherein the unique mobile content is a coupon and wherein the new unique mobile content is the coupon modified based upon sharing of the coupon by the user with the another device by the sending of the URL to the another user device; and
   i. wherein the modified coupon is provided by the content management server to the user device by generating a new URL and sending the new URL to the user device.

2. The method of claim 1 wherein the unique mobile content comprises a unique mobile content offer.

3. The method of claim 1 wherein the unique mobile content is a coupon.

4. The method of claim 1 wherein the machine-readable code is selected from the group consisting of: a barcode, a quick response (QR) code, a near-field communication (NFC) code, a radio-frequency identification (RFID) code, and combinations thereof.

5. The method of claim 1 wherein the user data is selected from the group consisting of: a date, a time, a GPS location of the machine-readable code, a type of communication device used to scan the machine-readable code, an orientation of a communication device when the machine-readable code was scanned, a type of operating system on a communication device that scanned an interactive code, and combinations thereof.

6. The method of claim 1 wherein the URL directs the user device to a Web page and wherein user data from the Web page is collected and consists of user data selected from the group consisting of: time spent on a Web page, purchases made, IP address, personal information input by the user, products viewed, and combinations thereof.

7. The method of claim 6 wherein the user data is collected and aggregated every time a user accesses the content management server or the machine-readable code.

8. The method of claim 1 wherein the user data includes personal information added by a user.

9. The method of claim 1 wherein in the step of generating a second URL corresponding to a new unique mobile content, the new unique mobile content is predetermined and stored within a database for distribution upon the user event occurrence.

10. The method of claim 1 wherein upon each subsequent scan of the machine-readable code, generating, by the content management server, a new URL which generates a new unique content for delivery to the user device.

11. The method of claim 1 wherein the user event occurrence is selected from the group consisting of: an action in a game, a score in the game, a charitable donation, a purchase, a predetermined time, an inventory, an action performed by a user in attendance of the game, and combinations thereof.

12. The method of claim 1 wherein the machine-readable code is printed on a surface, embedded within a surface, affixed to a surface, located within a liquid crystal display (LCD)/light emitting diode (LED)/e-ink display device on a surface, or displayed on a video board.

13. The method of claim 1 wherein the machine-readable code identifies a specific location via a known location of the machine-readable code, global positioning system (GPS), or both.

14. A method for delivering unique mobile content to a user device via a machine-readable code comprising the steps of:
   a. scanning, by the user device, the machine-readable code and determining an identification of a user, the user device, or both;
   b. determining whether a unique mobile wallet certificate is associated with said user device by querying a content management server, and if no unique mobile wallet certificate is associated therewith, issuing a new unique mobile wallet certificate to the user device;

c. collecting user data associated with the user device wherein the user device has an associated unique mobile wallet certificate;

d. selecting, based on the user data and the unique mobile wallet certificate associated with the user device, unique mobile content stored in a database;

e. providing, by the content management server, the unique mobile content via a uniform resource locator (URL) to the user device;

f. receiving a user event occurrence input from the user device caused by sharing of the URL by the user by the user sending the URL to another user device, wherein the user event occurrence input defines an event occurrence that is unique to the unique mobile wallet certificate associated with the user device;

g. in response to receiving the user event occurrence input, generating, by said content management server, a second URL corresponding to a new unique mobile content specifically for the user and providing the new unique mobile content to the user device;

h. wherein the user device receives in-venue metrics via a third-party source selected from the group consisting of: an in-venue metrics application programming interface (API), a third-party metrics API, a ticket brokerage metrics API, and combinations thereof; and i. wherein said in-venue metrics are utilized as data or to modify the unique mobile content by generating a new URL and sending the new URL to the user device.

15. The method of claim 14 wherein the unique mobile content comprises a unique mobile content offer, which is a coupon.

16. The method of claim 14 wherein the machine-readable code is selected from the group consisting of: a barcode, a quick response (QR) code, a near-field communication (NFC) code, a radio-frequency identification (RFID) code, and combinations thereof.

17. The method of claim 14 wherein the user data is selected from the group consisting of: a date, a time, a GPS location of the machine-readable code, a type of communication device used to scan the machine-readable code, an orientation of a communication device when the machine-readable code was scanned, a type of operating system on a communication device that scanned an interactive code, and combinations thereof.

18. The method of claim 14 wherein the URL directs the user device to a Web page and wherein user data from the Web page is collected and consists of user data selected from the group consisting of: time spent on a Web page, purchases made, IP address, personal information input by the user, products viewed, and combinations thereof.

19. The method of claim 14 wherein the user event occurrence is selected from the group consisting of: an action in a game, a score in the game, a charitable donation, a purchase, a predetermined time, an inventory, an action performed by a user in attendance of the game, and combinations thereof.

20. The method of claim 14 wherein the machine-readable code is printed on a surface, embedded within a surface, affixed to a surface, located within a liquid crystal display (LCD)/light emitting diode (LED)/e-ink display device on a surface, or displayed on a video board.

* * * * *